(Model.)

E. J. OLSON.
Churn.

No. 241,058. Patented May 3, 1881.

Witnesses
A. H. Krause
Fred. G. Dieterich

Inventor
Enoch J. Olson
by Louis Bagger & Co.
Attorneys

UNITED STATES PATENT OFFICE.

ENOCH J. OLSON, OF LEEDS, WISCONSIN.

CHURN.

SPECIFICATION forming part of Letters Patent No. 241,058, dated May 3, 1881.

Application filed February 7, 1881. (Model.)

*To all whom it may concern:*

Be it known that I, ENOCH J. OLSON, of Leeds, in the county of Columbia and State of Wisconsin, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1:
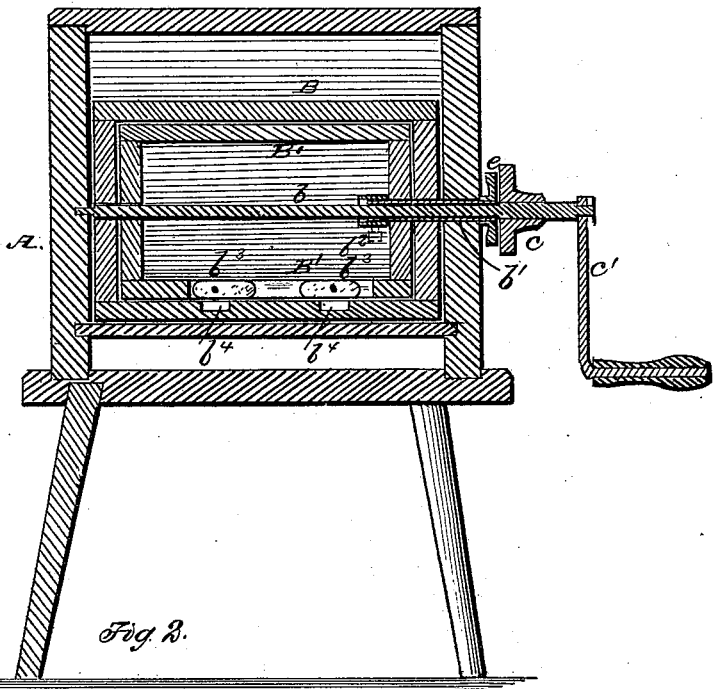
Figure 2:
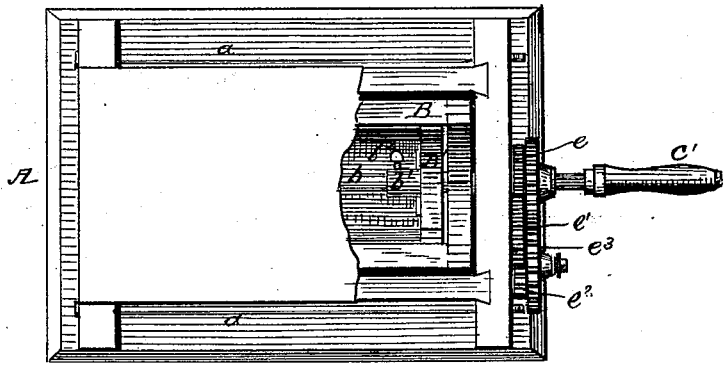
Figure 3:
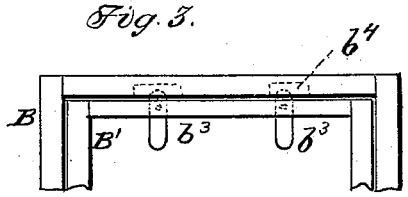

Figure 1 is a vertical section of my improved churn. Fig. 2 is a detail plan view of the same, partly broken away to expose the two concentric shafts of the dashers; and Fig. 3 is a detail side view of the dashers to show in particular the means for connecting them together.

This invention appertains to improvements in churns of that class employing two interoperating dashers revolving in opposite directions; and it consists in adapting the two dashers to revolve together after having performed the churning operation, to effect the gathering of the butter, substantially as hereinafter more fully set forth.

Referring to the accompanying drawings, A indicates the cream-receptacle, made preferably with a rounding bottom, and with its ends, to which the legs are attached, bolted to the body by rods or bolts $a$.

B B' are the dashers of the form shown, and one hung upon a shaft, $b$, bearing in the receptacle A, with one end provided with a pinion, $c$, having a crank, $c'$, on the outside of the receptacle. The other dasher is provided or secured to a sleeve or tubular shaft, $b'$, placed upon the shaft $b$, and having a set-screw, $b^2$, for securing it to and to cause it to revolve with the dasher B. The outer end of the shaft $b'$ is provided with a pinion, $e$, which receives motion from a pinion, $e'$, gearing with a third pinion, $e^2$, on a pinion, $e^3$, receiving its motion from and gearing with the pinion $c$.

By turning the crank $c'$ it will be observed that both dashers will be simultaneously operated and revolved in opposite directions, thus acting upon the cream so as to thoroughly agitate and churn the cream into butter. After churning the two dashers are caused to move together by tightening the screw $b^2$, or by turning the button $b^3$ in one dasher into a notch or slot, $b^4$, in the other dasher, when, by turning the crank, the dashers thus connected together will collect or gather the butter preparatory to its removal from the receptacle.

Having thus fully described my invention, I claim and desire to secure by Letters Patent of the United States—

In a churn, the combination of the dashers B' and B, provided, respectively, with the buttons $b^3$ and slots $b^4$, shaft $b$, tubular shaft $b'$, set-screw $b^2$, and mechanism for operating said shafts $b$ and $b'$, substantially as and for the purpose herein shown and described.

In testimony that I claim the foregoing as my own I have hereto affixed my signature in presence of two witnesses.

ENOCH J. OLSON.

Witnesses:
H. L. EBBIGHAUSEN,
C. J. HENSCHEL.